United States Patent [19]
Ostlie

[11] Patent Number: 4,943,954
[45] Date of Patent: Jul. 24, 1990

[54] METHOD AND A SYSTEM FOR COUNTERACTING MARINE BIOLOGIC FOULING OF A HULL OR A SUBMERGED CONSTRUCTION

[75] Inventor: Lars S. Ostlie, Sandnes, Norway
[73] Assignee: Infrawave A/S, Sandnes, Norway
[21] Appl. No.: 357,398
[22] Filed: May 26, 1989
[51] Int. Cl.$^5$ .................. H04B 11/00; B63B 59/00
[52] U.S. Cl. .................................. 367/191; 367/139; 181/0.5; 114/222
[58] Field of Search .............. 181/0.5; 367/131, 137, 367/138, 139, 141, 153, 191; 114/222, 67 R

[56] References Cited
U.S. PATENT DOCUMENTS
4,058,075 11/1977 Piper, Sr. ........................ 114/222
4,244,749 1/1981 Sachs et al. ..................... 367/154

Primary Examiner—Brian S. Steinberger
Attorney, Agent, or Firm—Pennie & Edmonds

[57] ABSTRACT

A system and a method for counteracting marine fouling of e.g. a vessel hull (1) are provided.

Electro-mechanical vibration transducers (2, 3) are arranged in pairs adjacent to fixed (clamped) nodal lines (4) on said hull (1), and are driven in an inverted phase relationship in order to provide a water particle movement in a hull parallel direction right outside said nodal lines (4) in addition to the hull perpendicular relative movements right outside said transducers (2, 3).

The invention also comprises a combination of the mechanical system above and a special surface coating which counteracts fouling from other organisms than those influenced by said water particle movement in the infrafrequency range.

10 Claims, 2 Drawing Sheets

PRESSURE AND VELOCITY DIPOLES

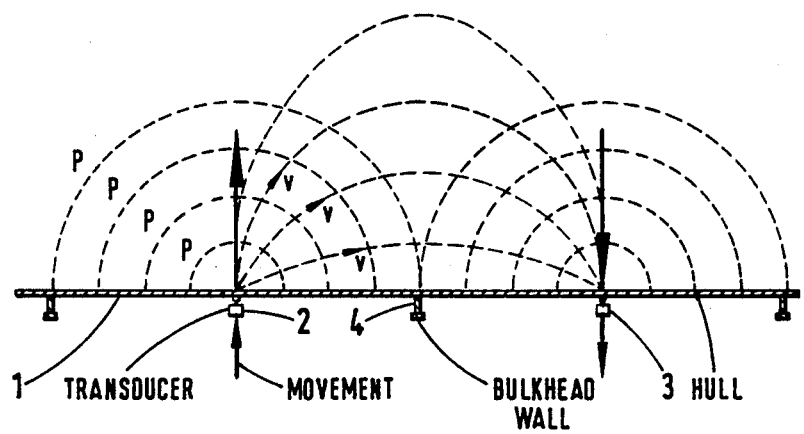
Fig.1 PRESSURE AND VELOCITY DIPOLES
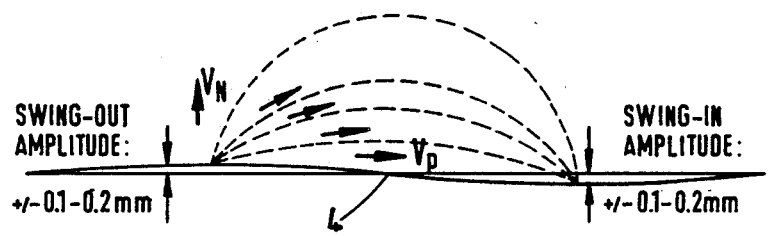
Fig.2 VELOCITY VECTORS

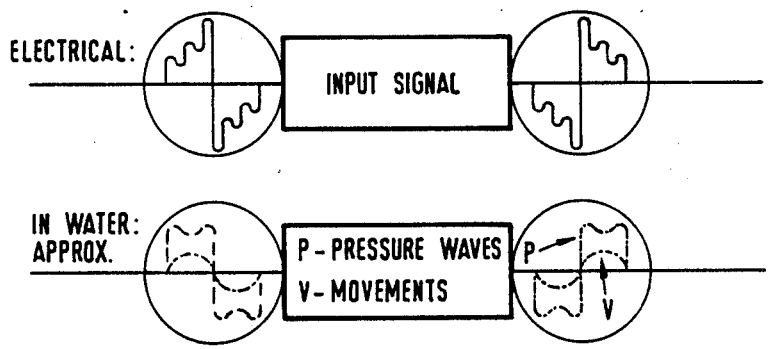
Fig. 3 APPLIED SIGNAL AND RESULT
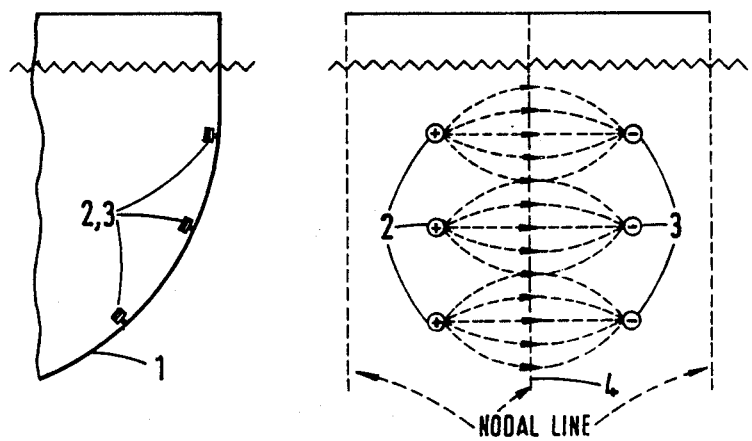
Fig. 4

METHOD AND A SYSTEM FOR COUNTERACTING MARINE BIOLOGIC FOULING OF A HULL OR A SUBMERGED CONSTRUCTION

The present invention relates to a method and a system for counteracting marine, i.e. marine biologic, fouling of a ship's hull or some other construction which is submerged in sea water, and more specifically by using mechanical vibrations.

In addition to the most common method of combating biologic fouling of a ship's hull under water, which consists in applying paint or some other coating with a repelling effect or which prevents growths/animals from getting stuck, also a number of vibration methods are previously known. Most often one utilizes sound waves, and the sound pressure itself is intended to prevent the fouling, usually by killing the organisms, generally small larvae, by means of a strong sound pressure.

For example, in Norwegian patent No. 82676 is used a system of high frequency sound, i.e. "ultrasound", from transducers mounted on the inside of the hull, so that the hull propagates ultrasonic frequencies (the wave lengths in the hull are then shorter than about 25 cm, and in the water just outside the hull shorter than about 7 cm).

It is also previously known to impose a vibrational state on the water just outside the ship's hull, with longitudinal vibrations in- or outside the ultrasonic frequency range, see Norwegian patent No. 100272. However, in that case separate transducers are used on the outside of the ship's hull, and said transducers are moreover particularly well isolated vibrationally from the ship's hull, in such a manner that only the water shall be moved.

The problems in connection with the systems based upon ultrasonics are that these systems are only able to keep surfaces of quite limited area clean of fouling. It has turned out to be difficult to cover large areas with such ultrasound-systems.

It has also turned out that low frequency vibration systems are able to give an anti-fouling effect. Previously known systems based upon low frequency vibrations have, however, had a relatively poor efficiency. The most important reason behind this poor effect, is that one has not realized which vibration-related physical processes give the effect of anti-fouling. One has supposed that in the same manner as in the ultrasound case, the sound pressure itself must be important, and consequently, one has merely tried to supply low-frequency sound to the relevant parts of the hull. The transducers used, with a typical maximum output of 5–6 watts, a resonance frequency about 160 Hz and with a relatively low efficiency, therefore has not been able to generate the sound power that would be necessary for such a principle.

Recently there has been obtained a better insight into the physical processes which are important in this connection. It has turned out that some marine organisms of large present interest, namely certain larvae in the size range 0,15–0,4 mm, "dislike" strong water particle movement in the infrasonic vibration range 20–60 Hz, i.e. when water particles move with amplitudes of +/−0.1–0, 2 mm and with a certain least maximum particle velocity. Under those conditions, said larvae are not deposited on the ship's hull or on the construction.

From Norwegian patent application No. 87.3306, with the same inventor as in the present invention, there is known such a low frequency vibration system, which system works using vibration frequencies in the 20–30 Hz range. Transducers are mounted on the inside of the hull, and the hull is excited into a state of transverse oscillations. The transverse vibrations of the hull prevent fouling by the previously mentioned types of larvae. The ship's hull is put into an oscillatory motion in a direction substantially perpendicularly to the hull, and the effect preventing the larvae in question in getting stuck on the hull, is that a water particle movement is achieved, moving toward and out from the hull due to the hull's own movement.

However, in larger ships/constructions there will always exist certain non-oscillating points or lines, i.e. nodal lines. For example bulkhead walls inside the ship's hull will constitute such fixed nodal lines in the locations where the bulkhead walls are welded to the hull, so that the ship's hull will vibrate only between the bulkhead walls. Thus, along such nodal lines the desired water particle movements will be too small to prevent fouling.

It must be emphasized that "nodal lines", "nodal points" in this application cannot be regarded as nodal lines or points in the usual acoustic sense, wherein nodal points (compare "Kundt's tube") are points with a periodic location in accordance with the sound wavelength. The way the expression is used in this application, there is intended lines or points on a ship's hull which are mechanically clamped, i.e. fixed from the inside of the hull by constructional details, usually bulkhead walls, and these lines or points therefore cannot undertake transverse oscillations. (The distance between bulkhead walls is often of the order 2–3 m, while the acoustic wavelength at frequency 20 Hz in steel sound velocity about 5.000 m per second - is about 250 m, which for standing waves would result in "traditional nodal points" with intervals of about 125 m, which is substantially longer than the distances in question here. The parameter values for wave propagation in a steel ship's hull between air and water are certainly modified in relation to the pure "bulk steel" values, but there is still a large difference in size order between the bulkhead intervals and traditional nodal point intervals).

The present invention aims to eliminate the fouling problem in the nodal line areas, and also aims to provide an efficient combating of said marine biologic type of fouling.

This is achieved by using a method and a system the kind which is precisely defined in the enclosed patent claims.

Further features and advantages of the present invention will best be understood by reference to the following description of a preferred embodiment of the invention together with the accompanying drawings, in which:

FIG. 1 shows a section through a ship's hull as well as pressure and velocity vectors in the water outside the hull;

FIG. 2 indicates more clearly the drive mode for the hull oscillations as well as the resulting longitudinal water particle movement adjacent to the hull;

FIG. 3 shows an example of applied electrical drive voltage to the transducers and the corresponding pressure behavior and particle movement behavior in the water; and FIG. 4 shows an arrangement of transducers on the inside of a ship's hull, in section and normal view.

In FIG. 1 appears a section through a ship's hull 1 to be put in oscillation by means of electro-mechanical transducers 2, 3. The problem is that the bulkhead wall 4 clamps the hull against transverse oscillations, so that the necessary relative water particle movement between water and hull is not achieved in this area, only in the surrounding areas where said hull is able to oscillate (up and down in the drawing).

However, as appears from FIG. 1, and also in an even clearer manner from FIG. 2, said transducers 2, 3 which are situated on each side of the nodal line right above the bulkhead wall 4, are drive in an inverted phase relationship in accordance with the present invention. This is indicated in FIG. 2 as respectively "Swing out" and "Swing in" amplitudes. For the moment it is supposed that the conditions are symmetrical about the nodal line at 4, and in this case the two transducers 2, 3 are excited in precisely inverted phases. From FIG. 3 appear curve shapes (drive voltages) which are applied to the transducers as a function of time, for one transducer to the left in the drawing, and simultaneously for the other transducer on the right side of the drawing.

Using such an inverted phase operation, a strong movement component is obtained for the water closely adjacent to the hull, see vector $v_p$ in FIG. 2, along the hull just in the nodal line area, and this particle movement gives the anti-fouling effect in that area.

Consequently water particle movement is obtained just outside all parts of the hull, however, the movement direction varies from a purely normal direction in the transducer area, to a purely hull parallel direction in the nodal line areas.

If the distances from the transducers 2, 3 to the nodal line 4 are different, or other conditions like thickness or structure variations provide an asymmetric situation, an additional phase shift may come in question for one of the drive signals in order to obtain the maximum movement effect right outside the nodal line.

In order to achieve the maximum movement velocity in the water, it is necessary to have as strong particle acceleration as possible. In the lower part of FIG. 3 appears an approximate square wave time behavior for the dynamic pressure in the water, which ensures maximum acceleration. Such a pressure behavior is obtained by applying to the transducers a drive signal of a special type, see the curve shapes in the upper part of FIG. 3. A fundamental frequency about 20–30 Hz forms the starting point for generating a number of harmonics, which harmonics are then added to or superposed upon said fundamental frequency. The coefficients used in this operation are determined from knowledge regarding particular physical characteristics of said transducers. The resonance frequency and the efficiency are of particular importance. Only odd harmonics are used in superposing operation.

FIG. 4 displays at left the ship's hull 1 in section as viewed along the axis of the ship. Six transducers are present, or which three are visible and the other three transducers are hidden right behind the three visible ones. In the right part of the drawing the same configuration is viewed from the side, and this drawing illustrates how the water particle velocity also achieves a sufficient value in the area along the nodal line 4 between the transducer pairs, by means of a superposing effect. Of course one also visualizes further transducer rows outside the indicated nodal lines in the outer edges of the right part of the drawing, which transducer rows cooperate in a corresponding manner with the transducer points shown.

It must be emphasized again that it is the particle movement in the microscopic water layer by the ship's hull which is of interest in preventing the fouling, and especially the particle movement amplitude and velocity. At a certain least velocity, larvae are prevented from getting stuck. It must be mentioned that in spite of the fact that the sound velocity in water is about 1.400 m/s, typical average particle velocities for the vibration movement are in the area about and below 1 mm/s.

In the previously mentioned paired transducer setup, transducer pairs are excited in inverted phase oscillations, so that "water dipoles" are created therebetween. The phenomenon can also be regarded as a so-called "push-pull" configuration, where the water mass simultaneously is pushed in one end and pulled in the other end. This mode of operation ensures the highest possible efficiency and movement coverage of the nodal line areas.

The water movement should preferably have the same spatial size order as the size of the larvae in question, that is the water particles must move with an amplitude of about $+/-0,1-0,2$ mm. In the vibrating areas of the hull, this is achieved by exciting oscillatory hull amplitudes of just such a size order, i.e. $+/-0,1-0,2$ mm. In order to achieve the necessary anti-fouling effect in the nodal line areas, it must additionally be taken care that the applied drive voltage to the transducers provide a maximum acceleration in the dipole system, and thereby also the highest possible velocity.

The special drive voltage applied to the transducers has a time behavior of a quite particular type. A Fourier technique is used in which odd harmonics are superposed upon the "key note" oscillation in question, and with scaling coefficients for each particular harmonic, which scaling coefficients are determined from a knowledge of different physical parameters for the transducers in question, like resonance frequency, efficiency and similar parameters. As an example it is possible to use the first, the third, the fifth and the seventh harmonic in the superposing procedure. When such a signal is passing through the electromagnetic transducer system and the mechanical system (hull and water mass), a pressure behavior is created in the water, which pressure behavior approximates a square curve, and further results in the desired maximum acceleration and highest particle velocity.

Thus, along one nodal line on the hull, inverted phase working transducers are situated in rows on each side of said nodal line, and said transducers are working in pairs against each other in a "push-pull" configuration. The effect is of course attenuated in a larteral direction, but due to the superposing from two adjacent pairs of transducers, there is also achieved a good effect sideways along the nodal line.

Furthermore, it is possible to make a row of such transducers cooperate in pairs with transducer rows on each side, i.e. when a transducer row is situated between two parallell nodal lines.

If the transducers in a pair are located in the same distance from the nodal line, the transducers shall normally oscillate in reverse phase with each other. However, if the distances are somewhat different, or other assymetric conditions are present, a certain additional phase change will be of interest for one of the two transducers in the pair. This phase deviation can be obtained by delaying one of the two inverted phase voltages correspondingly, so that optimum particle velocity conditions are always achieved over the nodal line.

Finally, it must be mentioned that the mechanical vibration system can be used advantageously in combination with a coating system which aims to prevent fouling by other types of organisms. In this respect these two effects will complete each other and provide a very good anti-fouling effect. In this connection there shall be used an anti-fouling layer consisting of a material which has very low surface tension/surface energy in relation to and against water, which lowers the possibility that the organisms in question can get stuck to the hull by adhesion. Another possibility is that the material is of a type which successively dissolves in sea water, and thereby removes organisms which are about to be deposited on the hull.

Possible layers for this type of completing effect consist of a material of organic type, preferably comprising therein silicon, fluorine, nitrogen or oxygen, possibly one or more of said substances in combination.

I claim:

1. Method for combating marine fouling on the outside of a construction submerged in water including a ship hull in which method is utilized a number of electro-mechanical vibration transducers (2, 3) mounted on the inside of such structure (1), said transducers (2, 3) applying mechanical, low frequency vibrations to the structure (1) itself when electrical drive energy is applied to said transducers, and in which method a subsystem generates and feeds electrical drive voltages to said transducers. characterized in that said transducers (2, 3), being arranged in pairs in such a manner that each transducer in one pair is situated at a predetermined distance from and on respective sides of a fixed nodal line (4) on said structure (1), are supplied with drive voltages having such a variation over time that a particle velocity vector field is imparted to the water outside such structure in which the vector field is parallel to the surface of the structure immediately outside said nodal line and has a maximized numerical value in the same area.

2. Method in accordance with claim 1, characterized in that said two transducers (2, 3) in a pair are driven substantially in inverted phase operation which deviation is determined from the precise locations of the transducers relative to each other and to said nodal line (4).

3. Method in accordance with claim 1, characterized in that said subsystem generates drive voltages for said transducers by
    (I) generating a sine wave with the fundamental frequency in question,
    (II) generating a number of odd harmonics with the sine wave as a starting point, for example the first, the third, the fifth and the seventh harmonic,
    (III) adding these odd harmonics to said sine wave using scaling coefficients selected on the basis of knowledge of transducer physical parameters, in order to create a periodic drive voltage curve with a characteristic time variation,
    which characteristic time variation of the drive voltage applied to each transducer implies an approximately square shaped time variation of the dynamic pressure in the water outside said hull, which provides maximum particle acceleration in the water and consequently the highest possible particle velocity.

4. Method of claim 1, characterized in that said two transducers (2, 3) in a pair are driven substantially in a deviating inverted phase operation, which deviation is determined from the precise locations of the transducers relative to each other and said nodal line.

5. System for counteracting marine fouling on the outside of a ship's hull (1) submerged in water, comprising
    (a) a number of electro-mechanical vibration transducers (2, 3) mounted on the inside of said ship's hull (1) in order to apply mechanical low frequency vibrations to the hull (1) itself when electrical drive energy is fed to said transducers (2, 3), said low frequency vibrations providing the counteracting of fouling by means of substantially normal relative water particle movements in areas with sufficient vibration amplitudes of the hull (1), and
    (b) a subsystem for generating and feeding said electrical drive energy, said subsystem comprising means for generating, amplifying and distributing the electrical drive voltages to the respective transducers, characterized in that
    (a) said transducers (2, 3) are arranged in pairs in such a manner that each transducer in one pair is situated at a predetermined distance from and on respective sides of a fixed nodal line (4) on said hull (1), and that
    (b) said subsystem further comprises means for generating and distributing drive voltages to said transducers (2, 3) with such time variation that a particle velocity vector field is imparted to the water outside said hull (1) having a hull parallel direction immediately outside said nodal line (4) and a maximized numerical value in the same area, whereby counteracting of fouling is also achieved in the nodal line area.

6. System in accordance with claim 5, characterized in that said means for generating and distributing drive voltages is adapted for inverting the phase of the drive voltage for one of the transducers in a pair relative to the voltage for the other, possibly also for adding a predetermined time delay to one of said two drive voltages for one pair, so that said two transducers in a pair are driven with relative deviated inverted phases from an inverted phase relationship.

7. System in accordance with claim 6, characterized in that the means for generating and distributing drive voltages is adapted for generating a drive voltage by
    (I) generating a sine wave with the fundamental frequency in question,
    (II) generating a number of odd harmonics using said sine wave as a starting point, for example the first, the third, the fifth and the seventh harmonic,
    (III) adding these odd harmonics to said sine wave using scaling coefficients selected on the basis of knowledge of physical parameters for said transducers, in order to provide a periodic drive voltage curve with a characteristic time variation with,
    which characteristic variation with time for the applied drive voltage to each transducer implies an approximately square shaped time variation of the dynamic pressure in the water outside said hull, which imparts maximum particle acceleration to the water and consequently the highest possible particle velocity.

8. System in accordance with claim 7, characterized in that said transducers are arranged in rows on each side of said nodal line along the ship's hull, whereby a superposing effect for particle velocity is obtained laterally between each transducer pair along said nodal line.

9. Combined system for counteracting marine fouling on the outside of a ship's hull, characterized in that the system comprises, in addition to those features appearing from claim 5, an anti-fouling layer for counteracting fouling by adhering organisms of a size on which the mechanical vibration frequencies do not have any influence, said anti-fouling layer comprising a material with low surface tension surface energy in relation to water for lowering the adhesion effect for the organisms in question, thereby removing organisms possibly deposited.

10. Combined system in accordance with claim 9, characterized in that said material is of an organic type and comprises a group consisting of oxygen, silicon, fluorine and nitrogen.

* * * * *